US008374932B2

(12) United States Patent
Marchetti et al.

(10) Patent No.: US 8,374,932 B2
(45) Date of Patent: *Feb. 12, 2013

(54) PAYMENT ENTITY DEVICE TRANSACTION PROCESSING USING MULTIPLE PAYMENT METHODS

(75) Inventors: John N. Marchetti, Monrovia, MD (US); Matthew Mullen, Danville, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/030,816

(22) Filed: Feb. 13, 2008

(65) Prior Publication Data

US 2009/0112661 A1    Apr. 30, 2009

Related U.S. Application Data

(63) Continuation-in-part of application No. 11/929,033, filed on Oct. 30, 2007.

(51) Int. Cl.
    *G06Q 20/00* (2012.01)
(52) U.S. Cl. ............... 705/35; 705/30; 705/39; 705/42; 705/43
(58) Field of Classification Search .................... 705/35, 705/39, 42, 43
    See application file for complete search history.

(56) References Cited

U.S. PATENT DOCUMENTS

| | | | |
|---|---|---|---|
| 5,790,677 A | 8/1998 | Fox et al. | |
| 5,826,241 A | 10/1998 | Stein et al. | |
| 5,850,446 A | 12/1998 | Berger | |
| 5,898,777 A | 4/1999 | Tycksen et al. | |
| 5,956,695 A | 9/1999 | Carrithers et al. | |
| 6,012,048 A | 1/2000 | Gustin et al. | |
| 6,032,133 A | 2/2000 | Hilt et al. | |
| 6,208,973 B1 | 3/2001 | Boyer et al. | |
| 6,292,789 B1 | 9/2001 | Schutzer | |
| 6,308,887 B1 | 10/2001 | Korman et al. | |
| 6,366,893 B2 | 4/2002 | Hannula et al. | |
| 6,408,284 B1 | 6/2002 | Hilt et al. | |
| 6,609,113 B1 | 8/2003 | O'Leary et al. | |
| 6,611,818 B1 | 8/2003 | Mersky et al. | |
| 6,704,714 B1 | 3/2004 | O'Leary et al. | |
| 6,932,268 B1 | 8/2005 | McCoy et al. | |

(Continued)

FOREIGN PATENT DOCUMENTS
WO    WO 2006/124808 A1    11/2006

OTHER PUBLICATIONS

American Express; S2S eInvoice & Pay; The Automated Invoice and Payment Solution that Drives Efficiencies and Cost Savings; EIPSFactSheet-0707; retrieved from internet Feb. 2008; <http://corp.americanexpress.com/gcs/s2s/einvoicepay/docs/S2S_eInvoicePay-Factsheet.pdf>.

(Continued)

*Primary Examiner* — Tien Nguyen
(74) *Attorney, Agent, or Firm* — Kilpatrick Townsend & Stockton LLP

(57) ABSTRACT

A method begins with a payment entity device receiving an accounts payable data file from a client entity processing module. The method continues with the payment entity device determining a method of payment for an account payable of the accounts payable data file in accordance with a payables profile. The method continues with the payment entity device initiating a first type of payment for the account payable when the method of payment is a first type; initiating a second type of payment for the account payable, when the method of payment is a second type, or initiating a third type of payment for the account payable when the method of payment is a third type.

23 Claims, 12 Drawing Sheets

U.S. PATENT DOCUMENTS

| | | |
|---|---|---|
| 6,996,542 B1 | 2/2006 | Landry |
| 6,999,943 B1 | 2/2006 | Johnson et al. |
| 7,003,495 B1 | 2/2006 | Burger et al. |
| 7,031,940 B2 | 4/2006 | Shigemi et al. |
| 7,058,611 B2 | 6/2006 | Kranzley et al. |
| 7,103,579 B1 | 9/2006 | Phillips et al. |
| 7,124,937 B2 | 10/2006 | Myers et al. |
| 7,156,294 B2 | 1/2007 | Roth |
| 7,269,575 B1 | 9/2007 | Concannon et al. |
| 7,313,545 B2 | 12/2007 | Degen et al. |
| 7,321,874 B2 | 1/2008 | Dilip et al. |
| 7,792,712 B2 | 9/2010 | Kantarjiev et al. |
| 7,792,717 B1 * | 9/2010 | Hankins et al. ............... 705/35 |
| 7,930,248 B1 | 4/2011 | Lawson et al. |
| 8,074,257 B2 | 12/2011 | Felsted et al. |
| 8,099,365 B2 | 1/2012 | Bhambri et al. |
| 8,135,383 B2 | 3/2012 | Bickerstaff et al. |
| 2001/0034702 A1 | 10/2001 | Mockett et al. |
| 2001/0037209 A1 | 11/2001 | Tarbutton et al. |
| 2002/0023053 A1 | 2/2002 | Szoc et al. |
| 2002/0032653 A1 | 3/2002 | Schutzer |
| 2002/0111886 A1 | 8/2002 | Chenevich et al. |
| 2002/0111915 A1 * | 8/2002 | Clemens et al. ............... 705/64 |
| 2002/0111916 A1 * | 8/2002 | Coronna et al. ............... 705/64 |
| 2002/0116331 A1 | 8/2002 | Cataline et al. |
| 2002/0152124 A1 | 10/2002 | Guzman et al. |
| 2002/0194138 A1 | 12/2002 | Dominguez et al. |
| 2003/0055792 A1 | 3/2003 | Kinoshita et al. |
| 2003/0088462 A1 | 5/2003 | Carrithers et al. |
| 2003/0195819 A1 | 10/2003 | Chen et al. |
| 2004/0117302 A1 | 6/2004 | Weichert et al. |
| 2004/0128240 A1 | 7/2004 | Yusin |
| 2004/0143527 A1 | 7/2004 | Benkert et al. |
| 2004/0215560 A1 | 10/2004 | Amalraj et al. |
| 2004/0230526 A1 * | 11/2004 | Praisner ............... 705/40 |
| 2004/0267648 A1 * | 12/2004 | Schaub ............... 705/35 |
| 2005/0033609 A1 | 2/2005 | Yang |
| 2005/0049974 A1 | 3/2005 | Jani et al. |
| 2005/0096011 A1 | 5/2005 | Yoshida et al. |
| 2005/0119918 A1 | 6/2005 | Berliner |
| 2005/0177494 A1 * | 8/2005 | Kelly et al. ............... 705/39 |
| 2005/0184145 A1 | 8/2005 | Law et al. |
| 2006/0068897 A1 | 3/2006 | Sanford et al. |
| 2006/0074799 A1 | 4/2006 | Averyt et al. |
| 2006/0178986 A1 | 8/2006 | Giordano et al. |
| 2006/0206425 A1 | 9/2006 | Sharma |
| 2006/0265298 A1 | 11/2006 | Lee et al. |
| 2006/0266821 A1 | 11/2006 | Zajkowski et al. |
| 2007/0016526 A1 | 1/2007 | Hansen et al. |
| 2007/0038560 A1 | 2/2007 | Ansley |
| 2007/0067239 A1 | 3/2007 | Dheer et al. |
| 2007/0124224 A1 | 5/2007 | Ayers et al. |
| 2007/0150411 A1 | 6/2007 | Addepalli et al. |
| 2007/0168234 A1 | 7/2007 | Rutkowski et al. |
| 2007/0192245 A1 | 8/2007 | Fisher et al. |
| 2007/0198277 A1 | 8/2007 | Philipp et al. |
| 2007/0255669 A1 | 11/2007 | Kashanov |
| 2007/0282743 A1 | 12/2007 | Lovelett et al. |
| 2007/0288377 A1 | 12/2007 | Shaked |
| 2008/0010204 A1 | 1/2008 | Rackley, III et al. |
| 2008/0011825 A1 | 1/2008 | Giordano et al. |
| 2008/0015985 A1 * | 1/2008 | Abhari et al. ............... 705/42 |
| 2008/0033878 A1 | 2/2008 | Krikorian et al. |
| 2008/0086417 A1 | 4/2008 | Bykov |
| 2008/0133407 A1 * | 6/2008 | Guillory et al. ............... 705/40 |
| 2008/0154769 A1 | 6/2008 | Anderson et al. |
| 2008/0162341 A1 * | 7/2008 | Zimmer et al. ............... 705/40 |
| 2008/0235101 A1 | 9/2008 | Piepenbrink et al. |
| 2009/0063353 A1 | 3/2009 | Viidu et al. |
| 2009/0076953 A1 | 3/2009 | Saville et al. |

OTHER PUBLICATIONS

Mastercard Advisors; Purchase Logic.

Mastercard Worldwide; Payment Gateway; MPG-Buyer 01; retrieved from internet Feb. 2008; <https://www.mastercardpaymentgateway.com/mpgpublic/pdf/buyers_sell_sheet.pdf>.

Mastercard Worldwide; Payment Gateway; MPG-Supplier 01; retrieved from internet Feb. 2008; <https://www.mastercardpaymentgateway.com/mpgpublic/pdf/supplier_sell_sheet.pdf>.

Office Action mailed Dec. 8, 2011 in related U.S. Appl. No. 12/030,824, 20 pages.

Notice of Allowance mailed Jun. 26, 2012 in related U.S. Appl. No. 12/030,804, 33 pages.

Notice of Allowance mailed Jun. 27, 2012 in related U.S. Appl. No. 12/030,785, 27 pages.

"GreenZap Building Payment Gateway to Deliver Instant Transactions," Business Wire, Oct. 12, 2005.

"Payment Data Systems, Inc. Announces Credit Card Gateway Services for Billers and Merchants," PR Newswire, Nov. 3, 2003.

"Country Survey—Russia: Russia's Payment Industry Catches Up," Electronic Payments International, Dec. 31, 2006.

Notice of Allowance mailed Nov. 23, 2012 in U.S. Appl. No. 11/929,033, 9 pages.

* cited by examiner

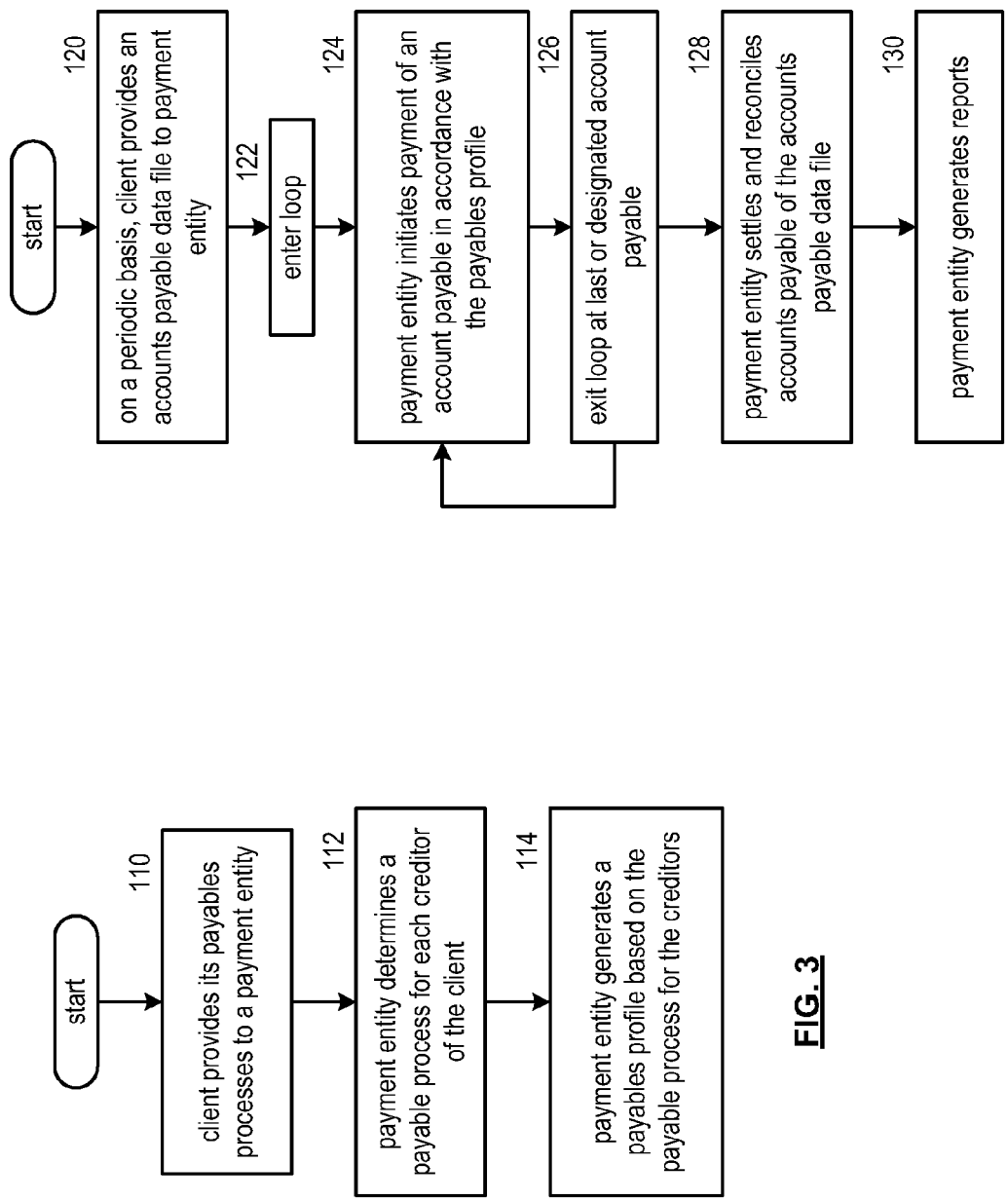

Payable Profile 140

| Creditor | AP type | Payment Method | Payment Terms | Financial Inst. |
|---|---|---|---|---|
| Supplier ABC | Price ≥ X | credit card | net 30 | Bank "A" |
| | Goods – Category 1 | line of credit | - | Bank "A" |
| Supplier B | All | wire transfer | per AP | Bank "A" |
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" |
| Supplier D | All for date 1 through date 2 | promissory note | - | VC "1" |
| | All goods/services after date 2 | credit card | net 30 | Bank "A" |
| | pay note | check | net 15 | Bank "B" |
| | Goods – Category "a" | account credit | - | - |
| Supplier E | All others | credit card | net 45 | Bank "B" |

FIG. 5

Payable Profile 140

| Creditor | AP type | Payment Method | Payment Terms | Financial Inst. |
|---|---|---|---|---|
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" | accounts payable data file 150

| Supplier | Invoice # | Item | Qty | Unit $ | Subtotal | Tax | S&H | Total | Alt. pay method |
|---|---|---|---|---|---|---|---|---|---|
| DEF | 2001 | AAA | 12 | $33.30 | $399.60 | $33.30 | $75.50 | $508.40 | check, net-45 |
| | 2002 | XXX | 12 | $3.33 | $39.96 | $3.30 | $7.50 | $50.76 | no |
| | 2003 | zzz | 10 | $3.00 | $30.00 | $3.00 | $7.50 | $43.50 | no |
| | 2004 | mmm | 1 | $300.00 | $300.00 | $30.00 | $75.50 | $435.50 | no |
| Totals: | | | | | $769.56 | $69.60 | $166.00 | $1,038.16 | | payment data 152 for Supplier DEF

| Invoice # | Invoice Date | Item | AP type | Total | Payment Method | Payment Terms | Financial Inst. | Payment Date |
|---|---|---|---|---|---|---|---|---|
| 2001 | 1/1/08 | AAA | Services – Category 1 | $508.40 | *check* | *net 45* | *Bank "B"* | *2/15/08* |
| 2002 | 1/2/08 | XXX | Services – Category 2 | $50.76 | check | net 30 | Bank "C" | 2/2/08 |
| 2003 | 1/3/08 | ZZZ | Goods – Category I | $43.50 | credit card | per AP | Entity "A" | today |
| 2004 | 1/4/08 | mmm | Goods – Category II | $435.50 | tangible consid. | - | Bank "A" | 1/19/08 |
| | | loan | loan payment | $500.00 | wire | - | Bank "A" | today |

FIG. 7

PAYMENT ENTITY DEVICE TRANSACTION PROCESSING USING MULTIPLE PAYMENT METHODS

CROSS-REFERENCE TO RELATED PATENTS

This patent application is claiming priority under 35 USC §120 as a continuation-in-part patent application of co-pending patent application entitled "System and Method for Processing Multiple Methods of Payment," having a filing date of Oct. 30, 2007, and a Ser. No. 11/929,033.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical field of the Invention

This invention relates generally to communication systems and more particularly to financial transactions communication systems.

2. Description of Related Art

Millions of credit card transactions are accurately processed every day regardless of whether the purchaser is making a purchase in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) reads a purchaser's credit card information and obtains a transaction amount. The terminal transmits the credit card information and the transaction amount to an acquirer bank, which combines the credit card information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

In an alternate credit card transaction processing system, the proprietary transaction network is owned by a single issuer bank. Thus, in contrast with the previously described system, the alternative system includes only one issue bank, not a large number of issuer banks, and, as such, the issuer bank's functions and the proprietary transaction network functions previously discussed are merged. In this alternate system, the processing of the single issuer is less than the multiple issuer system but creates a processing bottleneck due to the single issuer.

Regardless of the type of credit card transaction processing system, such systems provides consumers, whether individuals, small companies, or large corporate entities, an easy mechanism for paying for goods and/or services. For instance, many businesses use credit cards to purchase goods and/or services from a variety of suppliers as part of their procurement and payment processes. While businesses use credit cards to purchase goods and services, they also use other forms of payment as part of their procurement and payment processes. For example, a business may purchase goods and/or services using a check, a wire transfer, and/or an automated clearing house (ACH) debit account.

Software programs have been developed to assist businesses with their procurement and payment processes. Such software programs include provisions for tracking inventory, generating purchase orders, requesting invoices, and initiating and tracking payments for the desired goods and/or services. Once a payment is initiated, depending on the type of payment, it is processed outside of the software via the appropriate system. For example, a credit card transaction is processed as discussed above. After the payment is made, it is reconciled and the reconciled payment information is provided back to the business, or to its software. While this approach reduces the burdens on a business to purchase and pay for goods and/or services, it still requires a fair amount of input from the business to initiate payments, track them, and process the reconciled data.

Recently, proprietary transaction processing network providers have partnered with procurement and payment software entities to further reduce the burdens of a business by integrating the procurement and payment software with credit card payment processing. Such integration provides relatively seamless payment for goods and/or services being purchased with a credit card. Further, in a single issuer system, the system is capable of processing payments made via a check or an ACH debit account. As such, in a single issuer system, check payments and/or ACH debit account payments may be offered to the business.

While such advancements are reducing the payment and tracking burdens of a business, they are still somewhat disjointed, still require additional business involvement, and require involvement of the supplier financial chain (e.g., merchant, merchant's bank, etc.). For instance, in the integrated credit card payment system, the business still needs to process transactions using other forms of payment, which involves the supplier financial chain. In the single issuer system, the business is limited to using a credit card issued by the provider of the single issuer system, which dramatically limits payments options.

Therefore, a need exists for a method and apparatus that provides for seamless payment for goods and/or services regardless of the type of payment and/or the type of proprietary transaction processing network.

BRIEF DESCRIPTION OF THE SEVERAL VIEWS OF THE DRAWINGS

FIG. 3 is a logic diagram of an embodiment of a method for creating a payables profile in accordance with the present invention;

FIG. 4 is a logic diagram of an embodiment of a method for paying accounts payable in accordance with the present invention;

FIG. 5 is a diagram of an example of a payables profile in accordance with the present invention;

FIG. 7 is a diagram of an example of creating payment data from a payables profile and an accounts payable data file in accordance with the present invention;

DETAILED DESCRIPTION OF THE INVENTION

Figure 1:
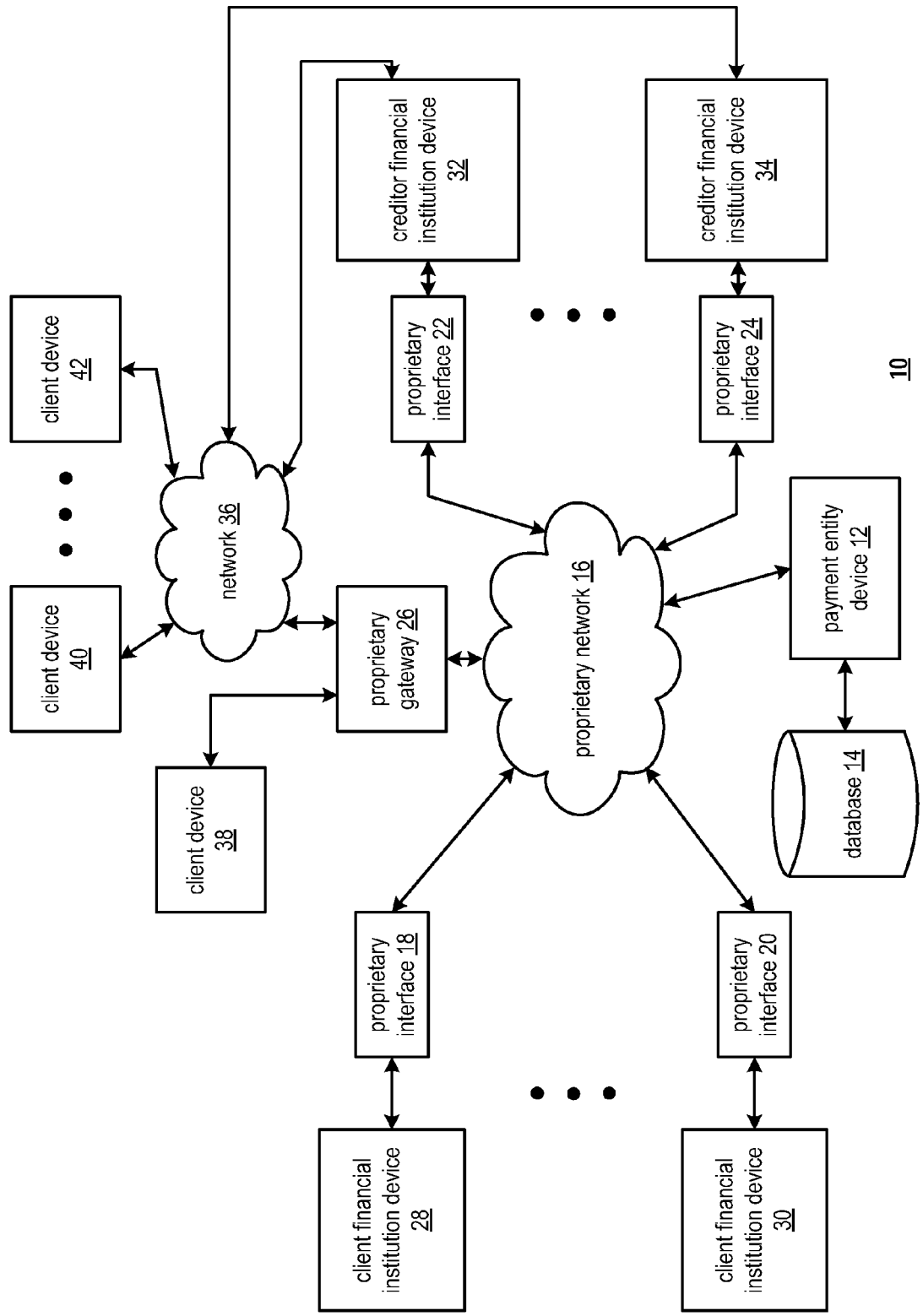
FIG. 1 is a schematic block diagram of an embodiment of a system in accordance with the present invention.

FIG. 1 is a schematic block diagram of an embodiment of a system 10 that includes a payment entity device 12, a database 14, a proprietary transaction processing network 16, a plurality of proprietary interfaces 18-24, a proprietary gateway 26, a plurality of client financial institution devices 28-30, a plurality of creditor financial institution devices 32-34, a network 36 (e.g., the internet), and a plurality of client devices 38-42.

The payment entity device 12, the database 14, and the proprietary network 16 may be operated and maintained by a single entity to facilitate seamless payment and reconciliation of accounts payable regardless of the payment method on behalf of one or more clients (e.g., individuals, businesses, agencies, and/or other entities). For example, Visa, Inc. may provide its VisaNet® as the proprietary network 16 and have one or more computing devices (e.g., computers, servers, super computers, main frames, etc.) coupled to the proprietary network 16 to function as the payment entity device 12, and may have one or more databases 14 coupled thereto.

In general, a client, via its device 38-42, establishes an account with the payment entity (e.g., Visa, Inc.), via its device 12. The account includes a level of service (basic, level 1, etc.), identity of the client and its device 38-42, and a payables profile. The payables profile includes a list of creditors (suppliers, merchants, service providers, etc.) of the client, identification information of the creditors, and one or more preferred methods of paying debt owed to a creditor.

With the account established, the payment entity is ready to provide payment and reconciliation support for the client. This function commences when the client, via its device 38-42, provides an accounts payable data file to the payment entity device 12 via the proprietary gateway 26 (and optionally the network 36) and the proprietary network 16. The proprietary gateway 26 is a proprietary node, modem, bridge, etc., that serves as a connection point to the proprietary network 16, which ensures that only authorized entities have access to the proprietary network 16. Note that communications within the system 10 occur in accordance with the communication protocol (e.g., internet protocol, transmission control protocol, and/or a proprietary version thereof) of the proprietary network 16.

Upon receiving the accounts payable data file, the payment entity device 12 retrieves the payables profile of the client, which may be stored in the database 14. The payment entity device 12 determines a method of payment (e.g., credit card [e.g., credit card, debit card, charge card, stored-value card, prepaid card, Electronic Benefit Transfer card, card account and other types of issued cards or accounts], funds transfer [e.g., wire transfer, account transfer within same financial institution, etc.], commercial paper [e.g., check, promissory note, etc.], tangible consideration [e.g., rebate, refund, goods and/or service exchange, etc.], debit account [e.g., ACH, line or credit, etc.], and credit card [e.g., business, debit card, auto pay, single use, etc.]), amount of payment, payment date, and terms of payment for each account payable in the accounts payable data file based on the payables profile. Alternatively, for an account payable, the payment entity device 12 may determine a different method of payment that is more optimal (e.g., less costly to process, better payment terms, rebate offer, rewards offer, etc.) for the client.

For a given account payable, the payment entity device 12 initiates a payment on behalf of the client in accordance with the method of payment, the amount of payment, the payment date, and the payment terms by sending a payment request to a client financial institution device 28-30 that corresponds to the type of payment (e.g., issuer bank for a credit card payment, a bank for check payment, a bank for wire transfer, etc., which may be the same or different banks).

The client financial institution device 28-30 processes the payment request in accordance with the type of payment. For example, if the type of method is a credit card payment, the client financial institution device 28-30 assists in the clearing and settlement process with the creditor's financial institution device 32-34. As another example, if the type of payment is a check, the client financial institution device 28-30 determines whether the client has sufficient funds in its account to cover the amount due. If yes, the client financial institution device 28-30 generates a check, sends it to the creditor, and generates a transaction completed message, which includes the check number, amount, creditor, payment date, etc. The client financial institution device 28-30 sends the transaction complete message to the payment entity device 12.

The payment entity device 12 monitors the payments of the accounts payable, collects the payment responses from the various financial institution devices 28-30 and 32-34, reconciles payments of the accounts payable, and generates reports thereof. As an example, the payment entity device 12 generates a client statement report that indicates how and when the accounts payable have been paid. In this manner, the client, after setting up an account, merely transmits an accounts payable data file to the payment entity device 12 and receives a statement when the accounts are paid, with little or no interaction to facilitate the payments regardless of the payment type.

Figure 2:
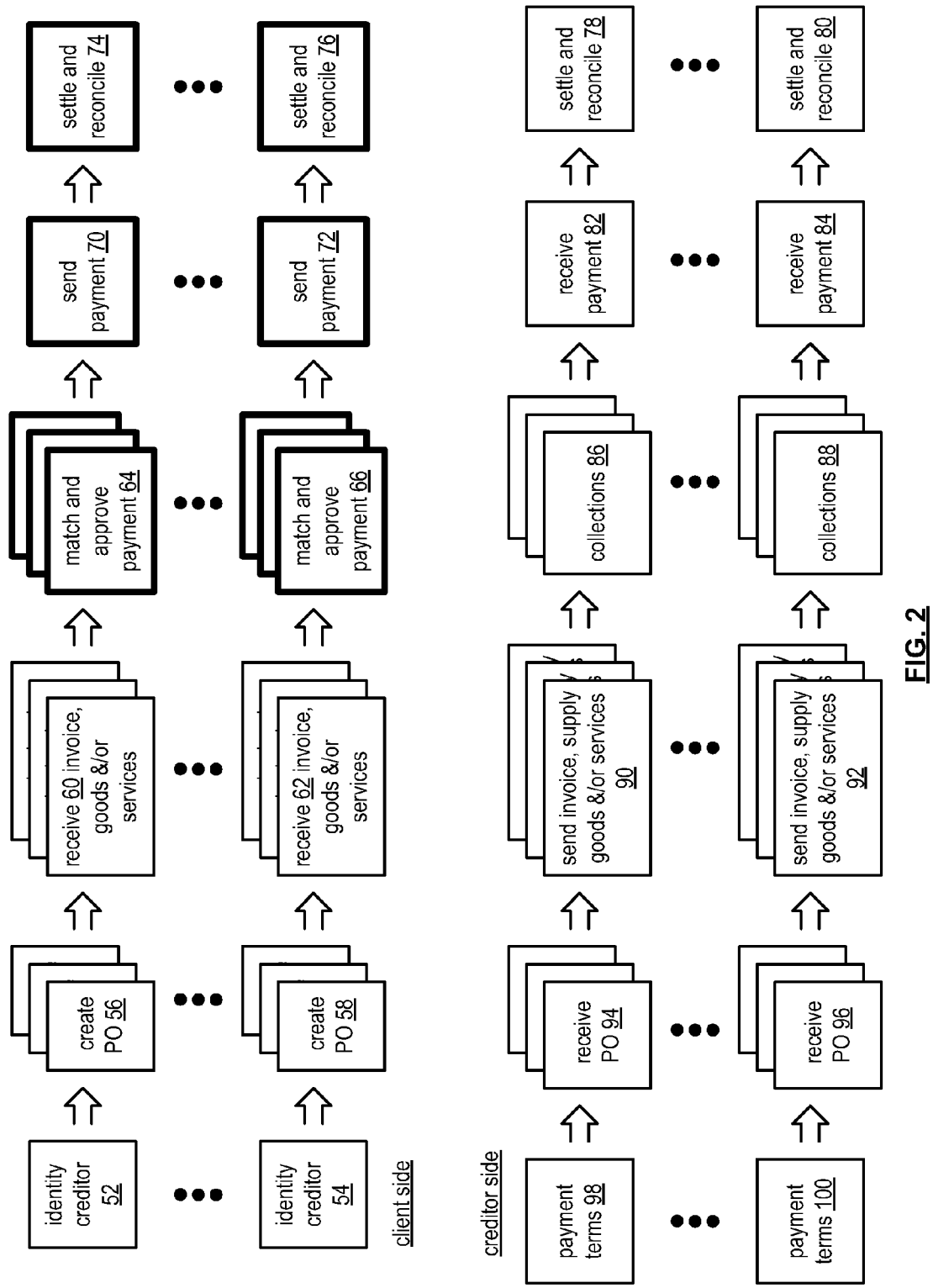
FIG. 2 is a diagram of an example of a payment and procurement process in accordance with the present invention.

FIG. 2 is a diagram of an example of a payment and procurement process that includes a client side and a creditor side. The client side includes identifying creditors (e.g., supplier, service provider, merchant, loan service, line of credit service, etc.) 52-54, creating purchase orders (PO) 56-58, receiving invoice for goods and/or services 60-62 per purchase order, match and approve payment 64-66 per purchase order, send payment 70-72 per purchase order or creditor, and settle and reconcile 74-76 each payment. The creditor side includes establish payment terms 98-100 for a client, receive purchase orders 94-96, send invoice for goods and/or services 90-92, generate collections (e.g., accounts receivable) 86-88, receive payments 82-84 for each purchase order or from a given client, and settle and reconcile payments 78-80. Note that the system of FIG. 1 supports the match and approve payment step 64-66, the send payment step 70-72, and/or the settle and reconcile step 74-76.

FIG. 3 is a logic diagram of an embodiment of a method for creating a payables profile that begins at step 110 where a client device 38-42 provides the client's payable processes to the payment entity device 12. The client's payables processes include identity of a creditor and, for each creditor, one or more preferred methods of payment (e.g., credit card, funds transfer, commercial paper, tangible consideration, debit account, and credit card), preferred payment terms, and identity of client's corresponding financial institution. Note that the client's payables processes may include more or less data. Further note that client's payables processes may include default information. For example, the default information may indicate a particular payment type for any non-specified creditor, may indicate a particular payment type for certain types of transactions regardless of creditor, may indicate a particular payment type for transactions greater than a certain value and another for transactions less than the certain value, may indicate, for a given payment type, to use a particular client financial institution, and/or may indicate to have the payment entity device to determine the payment method and/or client financial institution. As such, the client can provide as specific or as vague of guidelines as it desires as to how, when, and in what way its debts are to be paid.

The method then proceeds to step 112 where the payment entity determines a payables process for each creditor of the client based on the client's payables processes. For example, if the client provided a specific payables process for a specific creditor, then the payment entity stores this information for the specific creditor. As another example, if the client did not provide a specific payables process for a creditor, the payment entity may assign the default payment process or a payment entity identified payment process for the creditor. The method then proceeds to step 114 where the payment entity generates a payables profile for the client based on the payables processes for the creditors.

FIG. 4 is a logic diagram of an embodiment of a method for paying accounts payable that begins at step 120 where, on a periodic basis (e.g., weekly, bi-monthly, monthly, when initiated by the client), the client device 38-42 provides an accounts payable data file to the payment entity device 12. In an embodiment, the accounts payable data file includes, at a minimum, invoices from creditors of the client. The invoices may be arranged into a tabular form, or other form, and sorted based on creditor, item purchased, dollar amount, method of payment, and/or any other data point.

The method continues at step 122, where the payment entity device 12 enters a loop. Within the loop, the payment entity device 12 initiates a payment of an account payable in accordance with the payables profile at step 124. For example, for a given accounts payable, which may correspond to a single invoice from a given creditor or a group of invoices from the creditor, the payment entity device 12 accesses the payables profile with respect to the creditor. Based on the payment preferences specified in the payables profile, the payment entity device 12 generates a payment request and sends to the appropriate client financial institution. The payment entity device 12 remains in the loop unit the last or a designated account payable is reached at step 126. For example, the designated account payable may correspond to a cumulative total of payments being exceeded, a certain number of creditors, etc. Note that the payment initiation is being done without involvement of the creditor's financial institution as is typical in credit card transactions.

The method then continues at step 128 where the payment entity device settles and reconciles the accounts payable. For example, the payment entity device 12 receives payment notifications from the client's financial institutions, stores the payment notifications, and reconciles the payment notifications with the accounts payable. The method then continues at step 130 where the payment entity device 12 generates reports regarding the payment of the accounts payable. The payment entity device 12 may generate a report for the client, for itself, for the client's financial institution(s), and/or the creditor's financial institution(s).

FIG. 5 is a diagram of an example of a payables profile 140 that includes a plurality of fields. The fields may include more or less of a creditor field, an accounts payable type field, a payment method field, a payment terms field, and a financial institution field. In an embodiment, the payment entity device 12 stores, for the creditors of the client, the preferred payment method, payment terms, and financial institution for various types of accounts payable. The preferences may be provided by the client without input from the payment entity, may include input from the payment entity, or derived by the payment entity.

As shown for a given creditor, accounts payable may be grouped and have different payment preferences. For example, Supplier ABC has two groupings of accounts payable type: the first being any goods and/or services that have a purchase price greater than a specified price and goods in category 1. The specified price could be a per-item price or a cumulative price. For goods and/or services that exceed this price, the preferred payment method is a credit card, which should be paid net-30 from the date of an invoice, and to use one or more of the credit cards the client has that is/are issued from Bank "A".

For goods that fall into category 1 (e.g., office supplies, etc.), the preferred method of payment is a line of credit with Bank "A". In the case where goods of category 1 are purchased and exceed the price threshold, a hierarchical approach may be applied to determine which payment method to use. For example, in this instance, use the first preferred method.

For all other goods and/or services that are not within category 1 and have a price less than the threshold, the payment entity device 12 will use a default payment approach. The client may specify the default method or the payment entity device 12 may determine the default method.

As another example, Supplier B has indicated that all of its accounts payables are to be paid using a wire transfer, with payment terms it specifies in the account payable data file, and the funds should come from Bank "A". As yet another example, Supplier DEF has numerous account payable categories, each with a different payment preference. As shown, services of category 1 are to be paid using a debit account, services of category 2 are to be paid using a check, goods of category 1 are to be paid using a credit card, goods of category 2 are to be paid with tangible consideration (e.g., a credit, exchange of goods and/or services, etc.), and a loan payment is to be made using a wire transfer.

As a further example, Supplier D has two classifications for its accounts payable: one for accounts payable incurred between a first and second date and a second for accounts payable incurred subsequent to the second date. In this example, all accounts payable incurred between the first and second dates are to be paid using a promissory note from a venture capitalist (VC) "1". For accounts payable incurred after the second date, a credit card is to be used. Also, payments on the promissory note are to be made using a check from an account with Bank "B".

Figure 6:
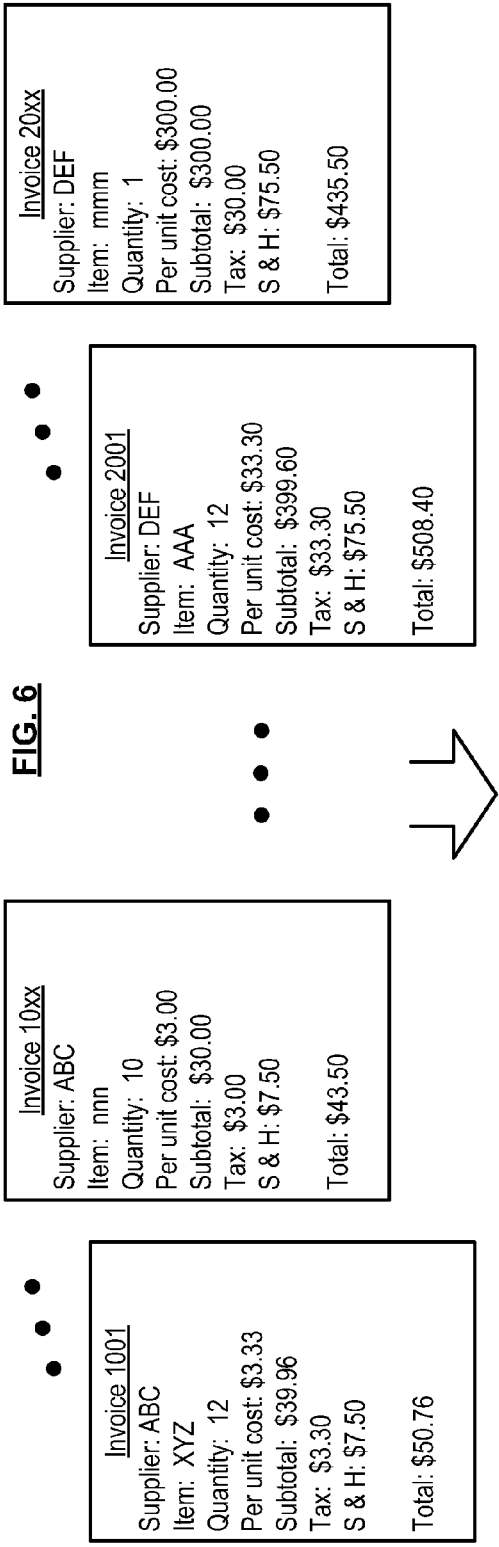
FIG. 6 is a diagram of an example of an accounts payable data file in accordance with the present invention.

FIG. 6 is a diagram of an example of an accounts payable data file 150 created from a plurality of invoices. In an embodiment, the invoices may stored and provided as the accounts payable data file 150. In another embodiment as shown, the invoices are tabulated to create the data file 150.

In this example, each invoice includes supplier identification information (e.g., name, address, creditor's financial institution, etc.), the items purchased, the quantity of items purchased, the unit cost of the items purchased, a subtotal, taxes, shipping and handling, and a total. On a per creditor basis, or some other basis (e.g., amount, item, etc.), the data is tabulated. In addition, the accounts payable data file may include an additional field to indicate with a particular account payable is to be paid in accordance with the payable profile or with an alternate payment process. In this example, invoice 2001 is to be paid using a check with a net-45 payment term.

FIG. 7 is a diagram of an example of creating payment data 152 from a payables profile 150 and an accounts payable data file 140 for a given creditor (e.g., supplier DEF). The payables profile 140 is a repeated from FIG. 5 for Supplier DEF and the account payable data file 150 is repeated from FIG. 6 for Supplier DEF with the addition of invoices 2002 and 2003. From these two data files, the payment entity device 12 generates the payment data 152, which is used to create payment requests that are sent to the appropriate financial institutions of the client.

For example, with respect to invoice 2001, the processing entity device 12 reviews the accounts payable data file 150 for this invoice to identify the invoice date, the item purchased, the purchase price, tax, shipping & handling, and if an alternate payment method is indicated. In this instance, there is an alternate payment method. As such, for invoice 2001, the payment entity device 12 generates the payment data to include the invoice number (e.g., 2001), the invoice date (e.g., Jan. 1, 2008), the item (e.g., AAA), the account payable type (e.g., Services—Category 1), the total price (e.g., $508.40, assuming tax and shipping & handling costs are being paid along with the purchase prices and not being paid using a different payment method), the payment method (e.g., check per the accounts payable file instead of a debit account as indicated in the payables profile), the payment terms (e.g., net 45 per the accounts payable data file), the financial institution identity (e.g., Bank "B" per the accounts payable data file instead of Bank "A" per the payables profile), and the payment date (e.g., Feb. 15, 2008, 45 days from the invoice date).

As another example, with respect to invoice 2002, the processing entity device 12 reviews the accounts payable data file 150 for the relevant information. In this instance, there is no alternate payment method. As such, for invoice 2002, the payment entity device 12 generates the payment data to include the invoice number (e.g., 2002), the invoice date (e.g., Jan. 2, 2008), the item (e.g., XXX), the account payable type (e.g., Services—Category 2), the total price (e.g., $50.76, assuming tax and shipping & handling costs are being paid along with the purchase prices and not being paid using a different payment method), the payment method (e.g., check per payables profile), the payment terms (e.g., net 30 per the payables profile), the financial institution identity (e.g., Bank "B" per the payables profile), and the payment date (e.g., Feb. 2, 2008, 30 days from the invoice date).

The payment entity device 12 generates the payment data 152 for invoice 2003 and 2004 in a similar manner as it generated the payment data 152 for invoice 2001. Note that since the payables profile and the accounts payable data file did not indicate payment terms for goods ZZZ purchase via invoice 2003, the payment entity device 12 initiates payment on a date it selects. In this example, the payment entity device 12 was programmed to select the date on which the data is compiled, however, it could be programmed to select any date or interval from the corresponding invoice date.

In this example, the payment entity device 12 also generates payment data 152 for a loan that the client has with Supplier DEF. The loan could be a line of credit, a loan, or some other form of monetary advancement. The payment data 152 for the loan indicates that $500.00 is to be wired from Bank "A" to Supplier DEF's account on the date the data is created.

Figure 8:
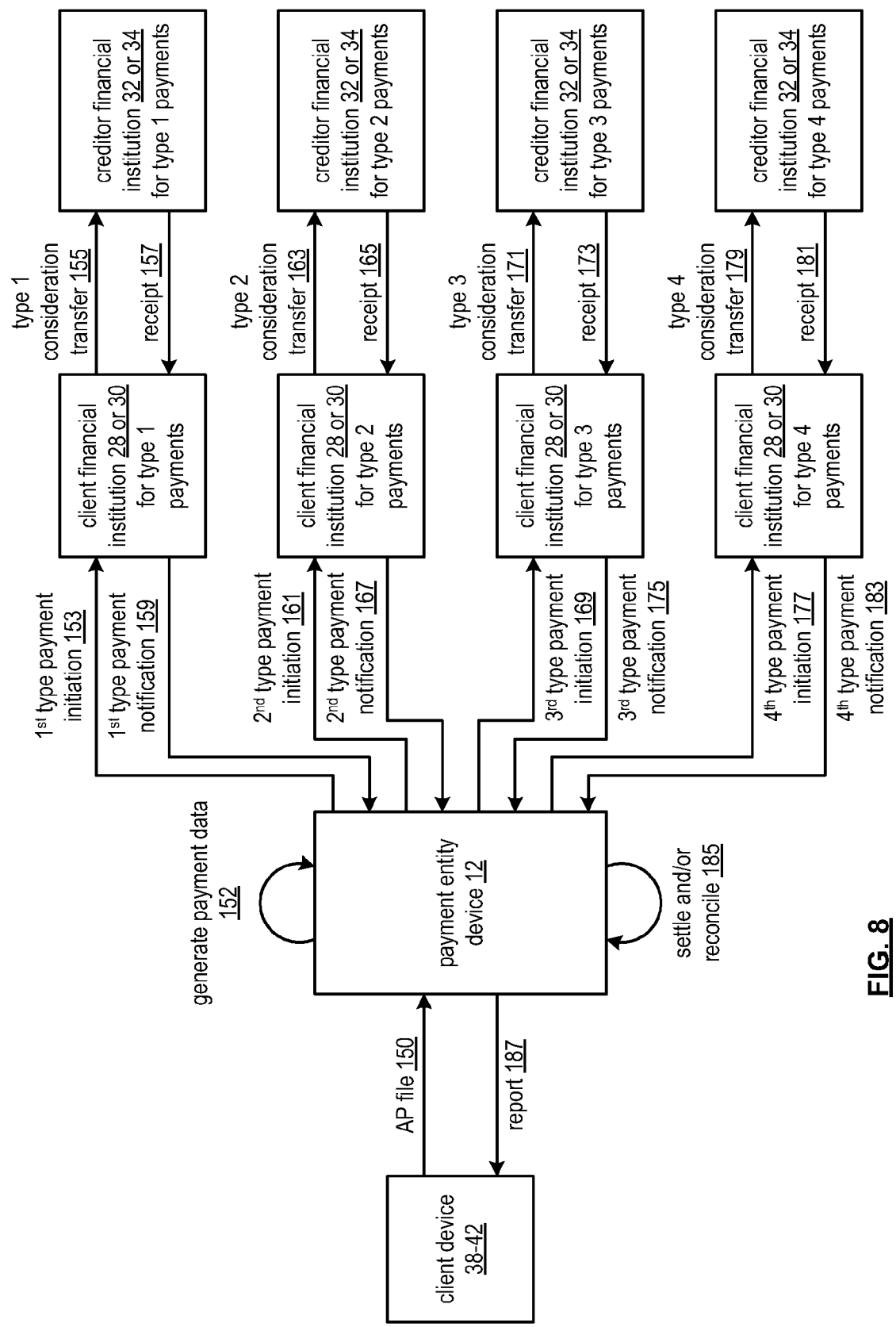
FIG. 8 is a schematic block diagram of an example of payment of accounts payable via a system in accordance with the present invention.

FIG. 8 is a schematic block diagram of an example of payment of accounts payable via the system 10 of FIG. 1. In this example, the client device 38-42 transmits an accounts payable data file 150 to the payment entity device 12. The payment entity device 12 processes the account payable data file 150 in accordance with the payables profile 140 for the client to generate the payment data 152.

The payment entity device 12 analyzes the payment data 152 on an per entry basis to determine a type of payment (e.g., credit card, funds transfer, commercial paper, tangible consideration, or debit account). When the type of payment is a first type, the payment entity device 12 transmits a $1^{st}$ type payment initiation request 153 to a client financial institution 28 or 30 that processes the $1^{st}$ type of payments. Assuming the payment is approved, the client financial institution 28 or 30 transfers the $1^{st}$ type of consideration 155 (e.g., funds transfer, check, line of credit, etc.) to a creditor financial institution 32 or 34 that processes the first type of payment. Upon crediting the $1^{st}$ type of consideration to the appropriate creditor's account, the creditor's financial institution 32 or 34 transmits a receipt of payment 157 to the client financial institution 28 or 30. The client financial institution 28 or 30 processes the receipt 157 to produce a $1^{st}$ type of payment notification 159. The client financial institution transmits the notification 159 to the payment entity device 12.

When the type of payment is a second type, the payment entity device 12 transmits a $2^{nd}$ type payment initiation request 161 to a client financial institution 28 or 30 that processes the $2^{nd}$ type of payments. Assuming the payment is approved, the client financial institution 28 or 30 transfers the $2^{nd}$ type of consideration 163 (e.g., funds transfer, check, line of credit, etc.) to a creditor financial institution 32 or 34 that processes the second type of payment. Upon crediting the $2^{nd}$ type of consideration to the appropriate creditor's account, the creditor's financial institution 32 or 34 transmits a receipt of payment 165 to the client financial institution 28 or 30. The client financial institution 28 or 30 processes the receipt 165 to produce a $2^{nd}$ type of payment notification 167. The client financial institution transmits the notification 167 to the payment entity device 12.

When the type of payment is a third type, the payment entity device 12 transmits a $3^{rd}$ type payment initiation request 169 to a client financial institution 28 or 30 that processes the $3^{rd}$ type of payments. Assuming the payment is approved, the client financial institution 28 or 30 transfers the $3^{rd}$ type of consideration 171 (e.g., funds transfer, check, line of credit, etc.) to a creditor financial institution 32 or 34 that processes the third type of payment. Upon crediting the $3^{rd}$ type of consideration 171 to the appropriate creditor's account, the creditor's financial institution 32 or 34 transmits a receipt of payment 173 to the client financial institution 28 or 30. The client financial institution 28 or 30 processes the receipt 173 to produce a $3^{rd}$ type of payment notification 175. The client financial institution transmits the notification 167 to the payment entity device 12.

When the type of payment is a fourth type, the payment entity device 12 transmits a $4^{th}$ type payment initiation request 177 to a client financial institution 28 or 30 that processes the $4^{th}$ type of payments. Assuming the payment is approved, the client financial institution 28 or 30 transfers the $4^{th}$ type of consideration 179 (e.g., funds transfer, check, line of credit, etc.) to a creditor financial institution 32 or 34 that processes the fourth type of payment. Upon crediting the $4^{th}$ type of consideration 179 to the appropriate creditor's account, the creditor's financial institution 32 or 34 transmits a receipt of payment 181 to the client financial institution 28 or 30. The client financial institution 28 or 30 processes the receipt 181 to produce a $4^{th}$ type of payment notification 183. The client financial institution transmits the notification 183 to the payment entity device 12. Note that the client financial institution that processes the first, second, third, and fourth types of payments may be the same financial institution, different institutions, or multiple financial institutions with at least one processing at least two types of payments. For example, a client may have a checking account and credit card with a first bank and having a line of credit and a debit account from a second bank.

As the payment entity device 12 receives the notifications 159, 167, 175, and/or 183, it stores them and processes 185 them to settle and reconcile the accounts payable. When this process is complete, or at any desired level of completion (e.g., on a per accounts payable basis up to all of the accounts payable in the accounts payable data file 150), the payment entity device 12 generates a report 187 regarding payment of the accounts payable and sends it to the client device 38-42. In such a system, the client sends its accounts payable information to the payment entity, which handles the payment, tracking, and reporting of paying the accounts payable with little or no further involvement of the client.

Figure 9:
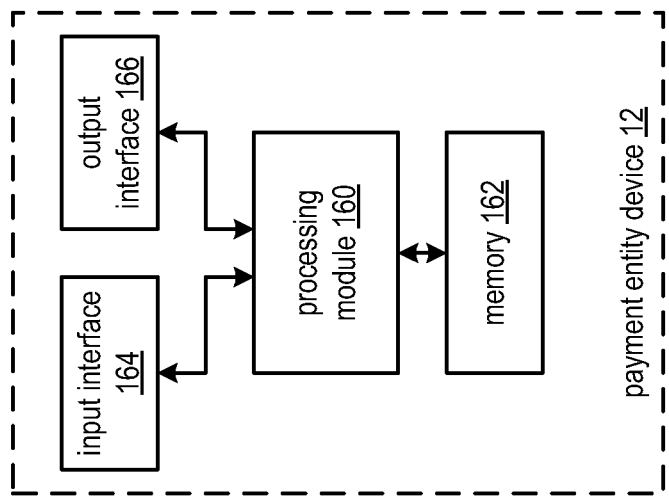
FIG. 9 is a schematic block diagram of an embodiment of a payment entity device in accordance with the present invention.

FIG. 9 is a schematic block diagram of an embodiment of a payment device 12 that includes a processing module 160, memory 162, an input interface 164, and an output interface 166. In an embodiment, the payment entity device 12 is a computer or similar processing device. In such an embodiment, the processing module 160 includes a central processing unit; the memory 162 includes system memory, cache memory, and read only memory; the input interface 164 includes a graphical user interface and/or a peripheral device interface (e.g., to connect to a mouse, a keyboard, etc.); and the output interface 166 includes a video card, printer card, etc. Note that, while not shown, the payment entity device 12 includes a network interface module such that it can access the proprietary network 16.

In general, the processing module 160 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 160 may have internal memory and/or is coupled to memory 162. Memory 162 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 162 stores, and the processing module 160 executes, hard coded and/or operational instructions corresponding to at least some of the steps and/or functions illustrated in FIGS. 1-15.

Figure 10:
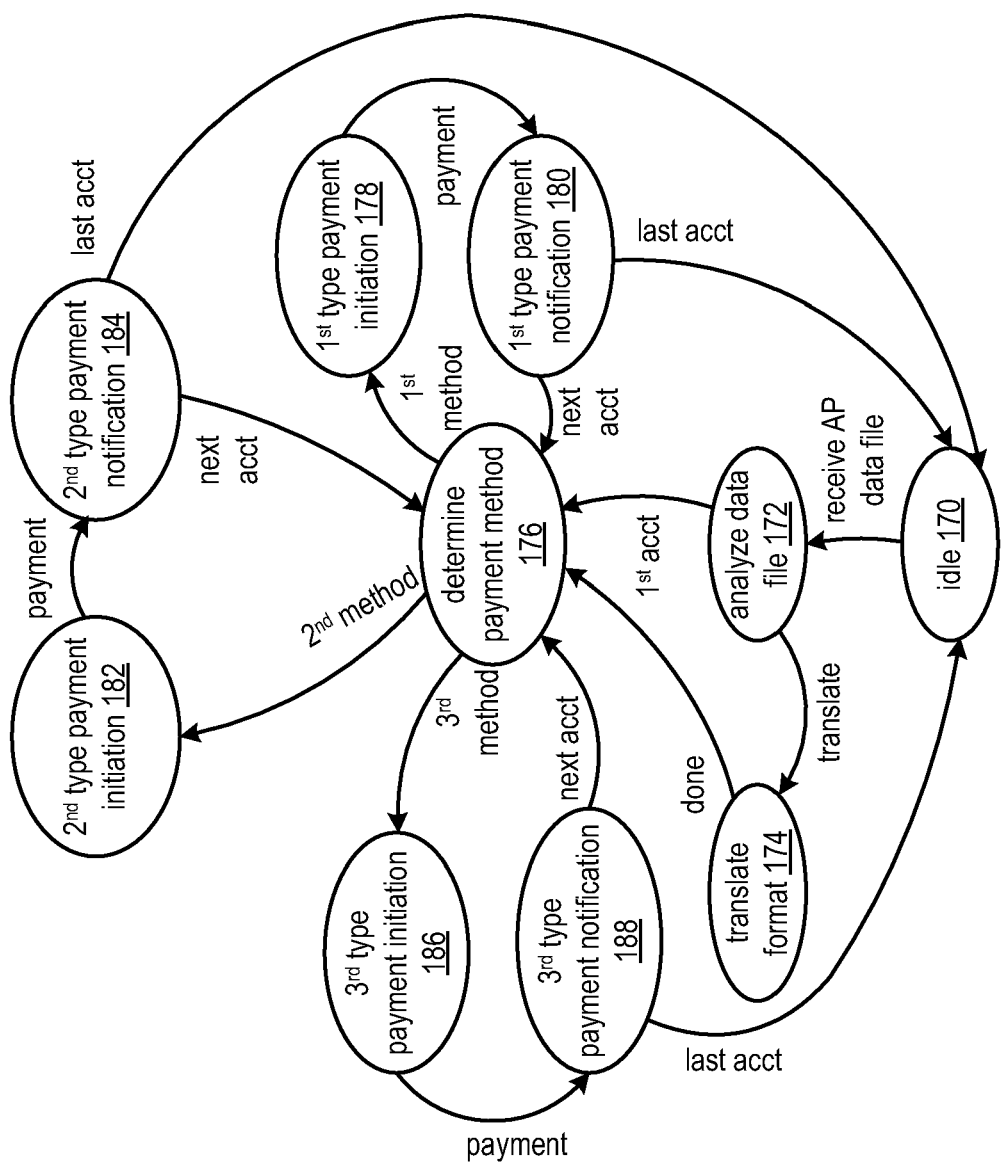
FIG. 10 is a state diagram of an embodiment of processing payment of accounts payable in accordance with the present invention.

FIG. 10 is a state diagram of an embodiment of processing payment of accounts payable that begins with the payment entity device in an idle state 170. The payment entity device transitions from the idle state to an analyze state 172 it is receives an accounts payable data file. An example of an accounts payable data file is discussed with reference to FIG. 6. In the analyze state 172, the payment entity device determines whether formatting of one or more accounts payable of the accounts payable data file needs to be translated. If one or more accounts payable needs to be translated, the payment entity device transitions to the translate format state 174. If no translation is needed, the payment entity device transitions to the determine payment method state 176.

In state 174, the payment entity device translates the formatting of the accounts payable data file, or a portion thereof, from one communication protocol format to another. For example, a first communication protocol may require a first type of formatting and a second communication protocol may require a second type of formatting. As a more specific example, if the account payable data file is received using a shared communication path based protocol (e.g., TCP/IP (Transmission Control Protocol/Internet Protocol)) it may be translated to a dedicated communication path based protocol (e.g., a frame relay format) or vice versa. After the translating is complete, the payment entity transitions to the determine payment method state 176.

In state 176, the payment entity device determines, on a per account payable basis, a method of payment, terms of payment, amount of payment, the creditor to be paid, the payment date, etc. This information is determined from the accounts payable data file in combination with the information of the payables profile. Upon determining the method of payment (e.g., commercial paper [e.g., a check, a promissory note, etc.}, a funds transfer [e.g., a wire transfer, an account to account transfer, etc.], tangible consideration [e.g., rebates, credit, loan payment, etc.], a debit account [e.g., an ACH account], or a credit card [e.g., debit card, prepaid card, conventional card, business card, elite card, etc.]), the payment entity device transitions to the $1^{st}$, $2^{nd}$, or $3^{rd}$ type of payment initiation state 178, 182, or 186.

When, for an account payable, the payment type is a first type, the payment entity device transitions to state 178 where it initiates payment of the account payable. In general, initiating a payment includes one or more of transforming a payment request into an appropriate format based on the type of payment, validating the payment request, and forwarding the payment request to an appropriate financial institution that will execute, or facilitate the execution of, payment. Once the payment request is transmitted, the payment entity device transitions to a $1^{st}$ type payment notification state 180.

In state 180, the payment entity device awaits an acknowledgement that the payment has been made. Once the acknowledgement is received, the payment entity processes the acknowledgement, which contains information pertinent to reconciling the payment such as the payment amount, the payment date, identification information of the financial institution making the payment, identification of the financial institution receiving the payment, a tracking number (e.g., the invoice number), etc. The processing of the acknowledgement includes reconciling the payment of an account payable with the particular account payable and may further include generating reports regarding the consolidated data.

When, for an account payable, the payment type is a second type, the payment entity device transitions to state 182 where it initiates a second type of payment of the account payable by generating a payment request. Once the payment request is transmitted, the payment entity device transitions to a $2^{nd}$ type payment notification state 184. In state 184, the payment entity device awaits an acknowledgement that the payment has been made. Once the acknowledgement is received, the payment entity processes the acknowledgement, which includes reconciling the payment of an account payable with the particular account payable and may further include generating reports regarding the consolidated data.

When, for an account payable, the payment type is a third type, the payment entity device transitions to state 186 where it initiates a third type of payment of the account payable by generating a payment request. Once the payment request is transmitted, the payment entity device transitions to a $3^{rd}$ type payment notification state 188. In state 188, the payment entity device awaits an acknowledgement that the payment has been made. Once the acknowledgement is received, the payment entity processes the acknowledgement, which includes reconciling the payment of an account payable with the particular account payable and may further include generating reports regarding the consolidated data.

Figure 11:
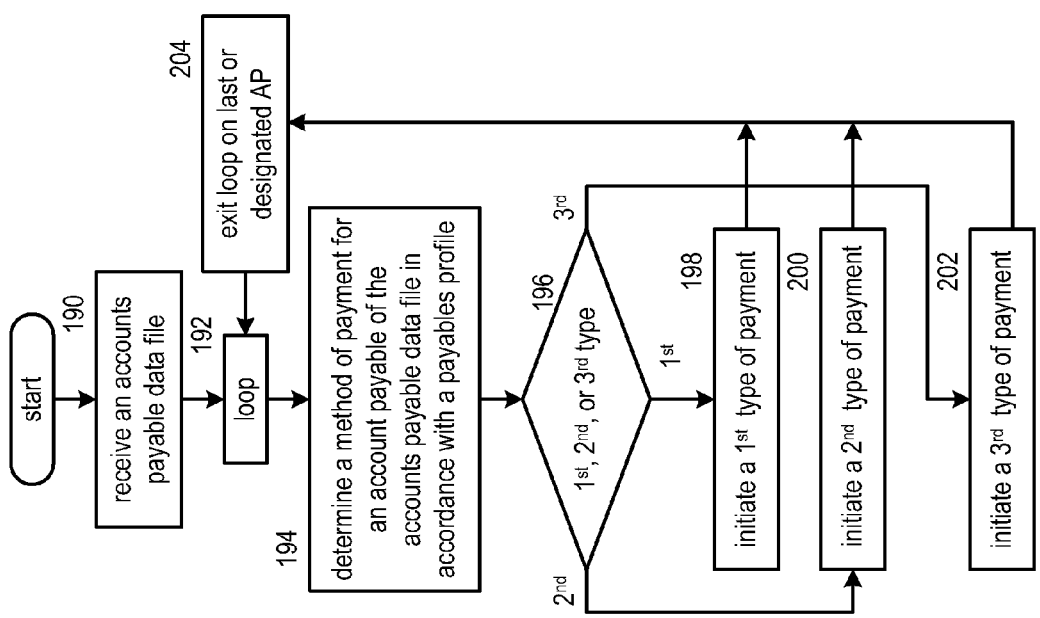
FIG. 11 is a logic diagram of an embodiment of a method for processing payment of accounts payable data in accordance with the present invention.

FIG. 11 is a logic diagram of an embodiment of a method for processing payment of accounts payable data that begins at step 190 where the payment entity device receives an accounts payable data file from a client entity processing module. An example of an accounts payable data file is discussed with reference to FIG. 6. The method continues to step 192 where the payment entity device enters loop.

Within the loop, the method continues at step 194 where the payment entity device determines a method of payment for an account payable of the accounts payable data file in accordance with a payables profile. The method or type of payment may be a commercial paper [e.g., a check, a promissory note, etc.}, a funds transfer [e.g., a wire transfer, an account to account transfer, etc.], tangible consideration [e.g., rebates, credit, loan payment, etc.], a debit account [e.g., an ACH account], or a credit card [e.g., debit card, prepaid card, conventional card, business card, elite card, etc].

The method branches at step 196 to step 198 when the method of payment is a first type, to step 200 when the method of payment is a second type, and to step 202 when the method of payment is a third type. At step 198, the payment entity device initiates a first type of payment for the account payable. As an example, initiating a payment includes one or more of transforming a payment request into an appropriate format based on the type of payment, validating the payment request, and forwarding the payment request to an appropriate financial institution that will execute, or facilitate the execution of, the payment. The method continues at step 204 where the payment entity device repeats the loop for another account payable until the last or a designated (e.g., a specified number of account payables, a predetermined period of time has elapsed since receiving the accounts payable data file, etc.) account payable is reached.

At step 200, the payment entity device initiates a second type of payment for the account payable. As an example, initiating a payment includes one or more of transforming a payment request into an appropriate format based on the type of payment, validating the payment request, and forwarding the payment request to an appropriate financial institution that will execute, or facilitate the execution of, the payment. The method continues at step 204 where the payment entity device repeats the loop for another account payable until the last or a designated (e.g., a specified number of account payables, etc.) account payable is reached.

At step 202, the payment entity device initiates a third type of payment for the account payable. As an example, initiating a payment includes one or more of transforming a payment request into an appropriate format based on the type of payment, validating the payment request, and forwarding the payment request to an appropriate financial institution that will execute, or facilitate the execution of, the payment. The method continues at step 204 where the payment entity device repeats the loop for another account payable until the last or a designated (e.g., a specified number of account payables, etc.) account payable is reached.

Figure 12:
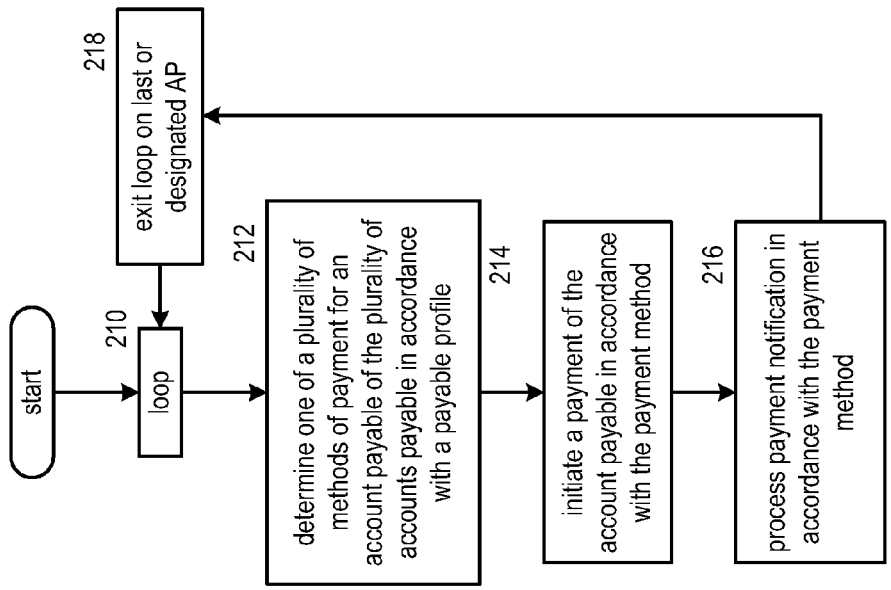
FIG. 12 is a logic diagram of another embodiment of a method for processing payment of accounts payable data in accordance with the present invention.

FIG. 12 is a logic diagram of another embodiment of a method for processing payment of accounts payable data that begins at step 210 where the payment entity device enters a loop of processing accounts payable of the accounts payable data file. Within the loop, the method continues at step 212 where the payment entity device determines one of a plurality of methods of payment in accordance with a payable profile. An example of this is discussed with reference to FIG. 7. Note that the plurality of payment methods includes at least two of a commercial paper, a funds transfer, tangible consideration, a debit account transfer, and a credit card payment.

The method continues at step 214 where the payment entity device initiates a payment of the account payable in accordance with the one of the plurality of methods of payment. The method continues at step 216 where the payment entity device processes payment notification in accordance with the one of the plurality of methods of payment. As mentioned above, payment notification may include reconciling the accounts payable with payments made and may further include generating appropriate reporting therefrom. The method continues at step 218 where the payment entity device repeats the loop for another account payable until the last or a designated (e.g., a specified number of account payables, etc.) account payable is reached.

Figure 13:
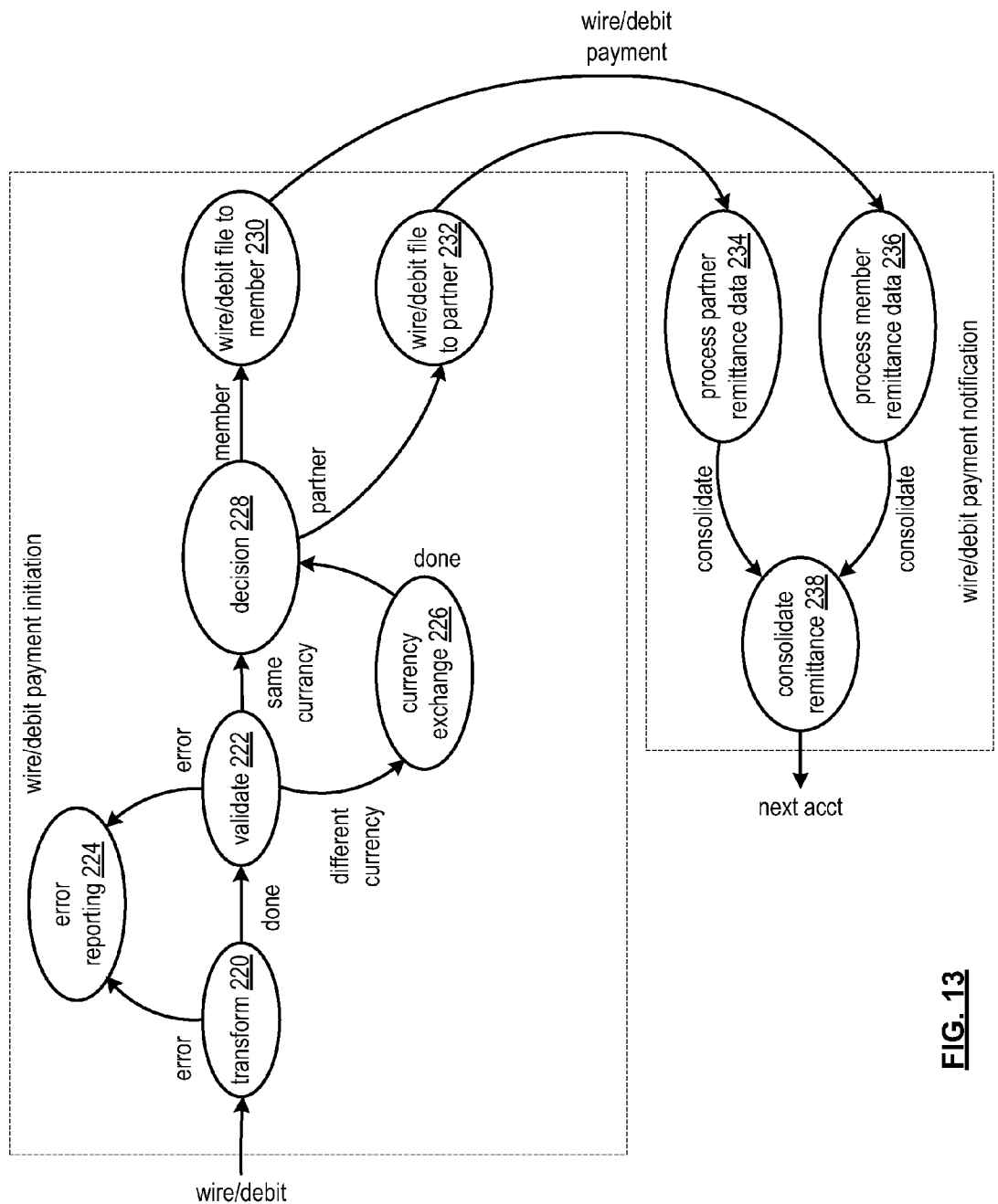
FIG. 13 is a state diagram of an embodiment of a method for processing wire transfer or debit account payment transactions in accordance with the present invention.

FIG. 13 is a state diagram of an embodiment of a method for processing wire transfer or debit account payment transactions that includes a payment initiation state and a payment notification state. In the payment initiation state, the payment entity device begins at a transformation state 220. The transformation involves generating a payment request in an appropriate format for a wire transfer or a debit account payment.

For example, a wire transfer may have a desired format per one or more of SWIFTNet, CHIPS, FEDWire, while a debit account may have a format in accordance with ACH. If a properly transformed payment request message cannot be generated, the payment entity device transitions to the error reporting state 224. In this state, the payment entity device identifies the current account payable as not being initiated due to a transformation error.

If, however, the transformation is successful, the payment entity device transitions to a validation state 222. In this state, the payment entity device is verifying that the payment request is in accordance with payment instructions of the client, of the payment entity, and/or of the client's financial institution making the payment. If the request is not validated, the payment entity device transitions to the error reporting state 224.

When the validation is successful, the payment entity device determines whether the currency of payment needs to be changed. For example, if the invoice is in Euros, but the client pays using US currency, then a current exchange is needed. When a currency exchange is needed, the payment entity device transitions to a current exchange state 226, where it exchanges the currency to the desired currency of payment. When the payment amount is converted into the desired currency, the payment entity device transitions to a decision state 228.

In state 228, the payment entity device determines whether the client's financial institution paying the debt is a member entity or a partner entity. In general, a member entity (e.g., a bank) that owns the treasury services business for the client issuing the accounts payable data file while a partner entity is a third party engaged by the payment entity that provides the treasury services on behalf of the client without a direct relationship with the client. When the financial institution is a member, the payment entity device transitions to a file to member state 230 and when the financial institution is a partner, the payment entity device transitions to a file to partner state 232. After transmitting the file, the payment entity device waits for an acknowledgement of payment.

When the payment entity device receives an acknowledgement, or remittance data, of payment from a partner, it transitions to state 234. In this state, the payment entity device processes the remittance data to reconcile payment of an account payable. The remittance data may include one or more of identity of the financial institution, the amount paid, the method of payment, the date paid, identity of the financial institution receiving the payment, the account number of the creditor, identify the of creditor, identify of the goods or services, an invoice number and/or other tracking number, etc.

After the remittance data has been processed, the payment entity transitions to a consolidate remittance state 238. In this state, the payment entity device is accumulating the reconciled data for each account payable into a reconciliation data for the accounts payable of the accounts payable data file. The reconciliation data may be tabulated in a variety of ways based on the desired presentation. For example, the data may be sorted based on creditor, date paid, amount paid, type of goods or services purchased, etc.

When the payment entity device receives an acknowledgement, or remittance data, of payment from a member, it transitions to state 236. In this state, the payment entity device processes the remittance data to reconcile payment of an account payable. After the remittance data has been processed, the payment entity transitions to a consolidate remittance state 238. In this state, the payment entity device is accumulating the reconciled data for each account payable into a reconciliation data for the accounts payable of the accounts payable data file. Note that, since a member has a relationship with the client, it may elect to retain some of the responsibilities for reporting payment details back to the client.

Figure 14:
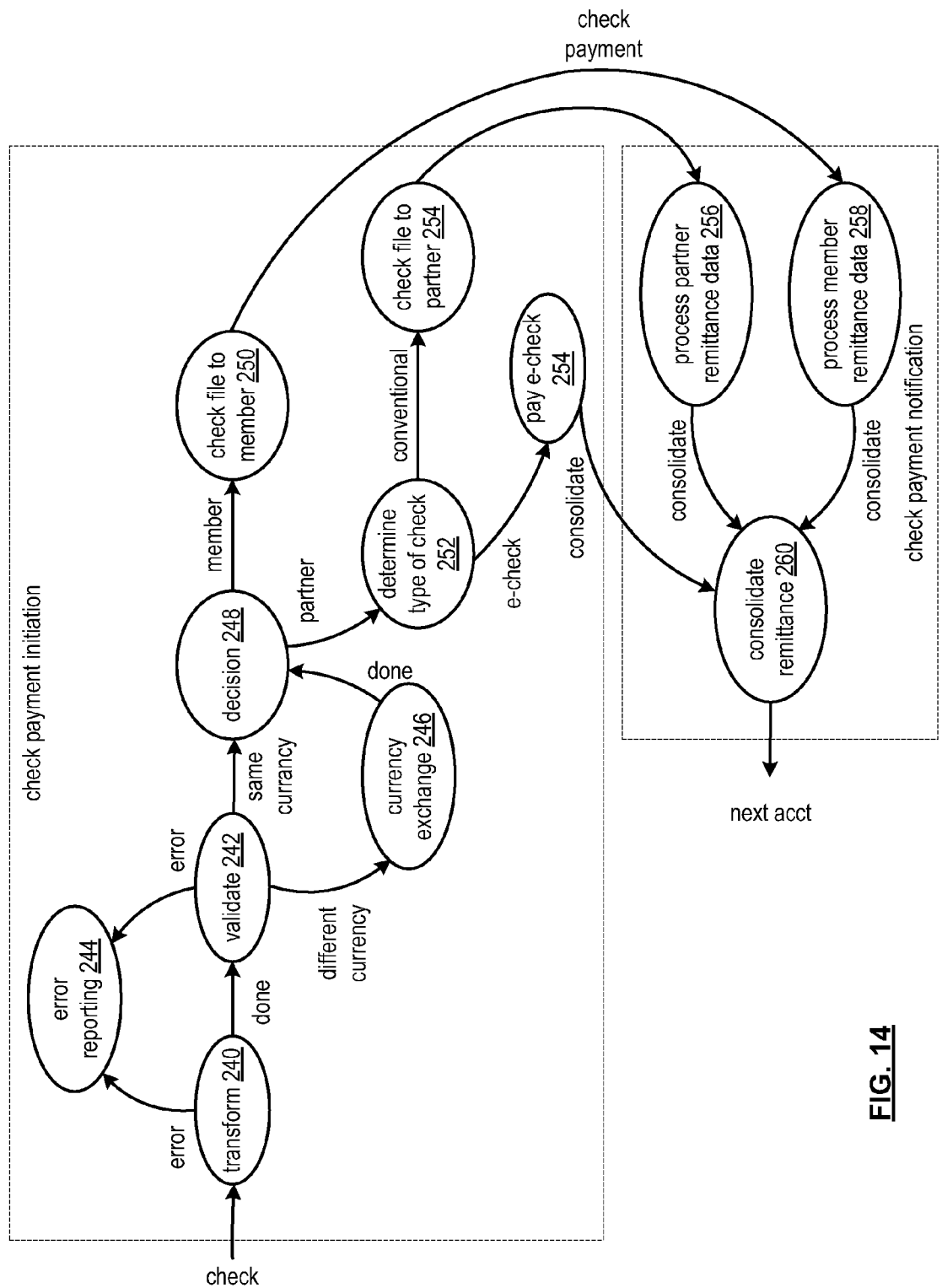
FIG. 14 is a state diagram of an embodiment of a method for processing check payment transactions in accordance with the present invention.

FIG. 14 is a state diagram of an embodiment of a method for processing check payment transactions that includes a payment initiation state and a payment notification state. In the payment initiation state, the payment entity device begins at a transformation state 240. The transformation involves generating a payment request in an appropriate format for a check payment. For example, a check may have a desired format (e.g., X9.37). If a properly transformed payment request message cannot be generated, the payment entity device transitions to the error reporting state 244. In this state, the payment entity device identifies the current account payable as not being initiated due to a transformation error.

If, however, the transformation is successful, the payment entity device transitions to a validation state 242. In this state, the payment entity device is verifying that the payment request is in accordance with payment instructions of the client, of the payment entity, and/or of the client's financial institution making the payment. If the request is not validated, the payment entity device transitions to the error reporting state 244.

When the validation is successful, the payment entity device determines whether the currency of payment needs to be changed. When a currency exchange is needed, the payment entity device transitions to a current exchange state 246, where it exchanges the currency to the desired currency of payment. When the payment amount is converted into the desired currency, the payment entity device transitions to a decision state 248.

In state 248, the payment entity device determines whether the client's financial institution paying the debt is a member entity or a partner entity. When the financial institution is a member, the payment entity device transitions to the transmit a properly transformed check file to member state 250. After transmitting the file, the payment entity device waits for an acknowledgement of payment.

When the payment entity is a third party, the payment entity device transitions to a determine type of check state 252. In this state, the payment entity is determining whether the check is a conventional check or an e-check. When the check is conventional, the payment entity transitions to a transmit a properly transformed check file to partner state 254. After transmitting the file, the payment entity device waits for an acknowledgement of payment.

When the payment entity device receives an acknowledgement, or remittance data, of payment from a partner, it transitions to state 256. In this state, the payment entity device processes the remittance data to reconcile payment of an account payable. After the remittance data has been processed, the payment entity transitions to a consolidate remittance state 260. In this state, the payment entity device is accumulating the reconciled data for each account payable into a reconciliation data for the accounts payable of the accounts payable data file.

When the payment entity device receives an acknowledgement, or remittance data, of payment from a member, it transitions to state 258. In this state, the payment entity device processes the remittance data to reconcile payment of an account payable. After the remittance data has been processed, the payment entity transitions to a consolidate remittance state 260. In this state, the payment entity device is accumulating the reconciled data for each account payable into a reconciliation data for the accounts payable of the accounts payable data file. Note that, since a member has a relationship with the client, it may elect to retain some of the responsibilities for reporting payment details back to the client.

When the type of check is an e-check, the payment entity device transitions to a pay e-check state 254. In this state, the payment entity device makes the e-check payment on behalf of the client and/or facilitates the e-check payment. Since the payment entity device is directly involved in the payment, once the payment is made, it transitions to the consolidate remittance state 260.

Figure 15:
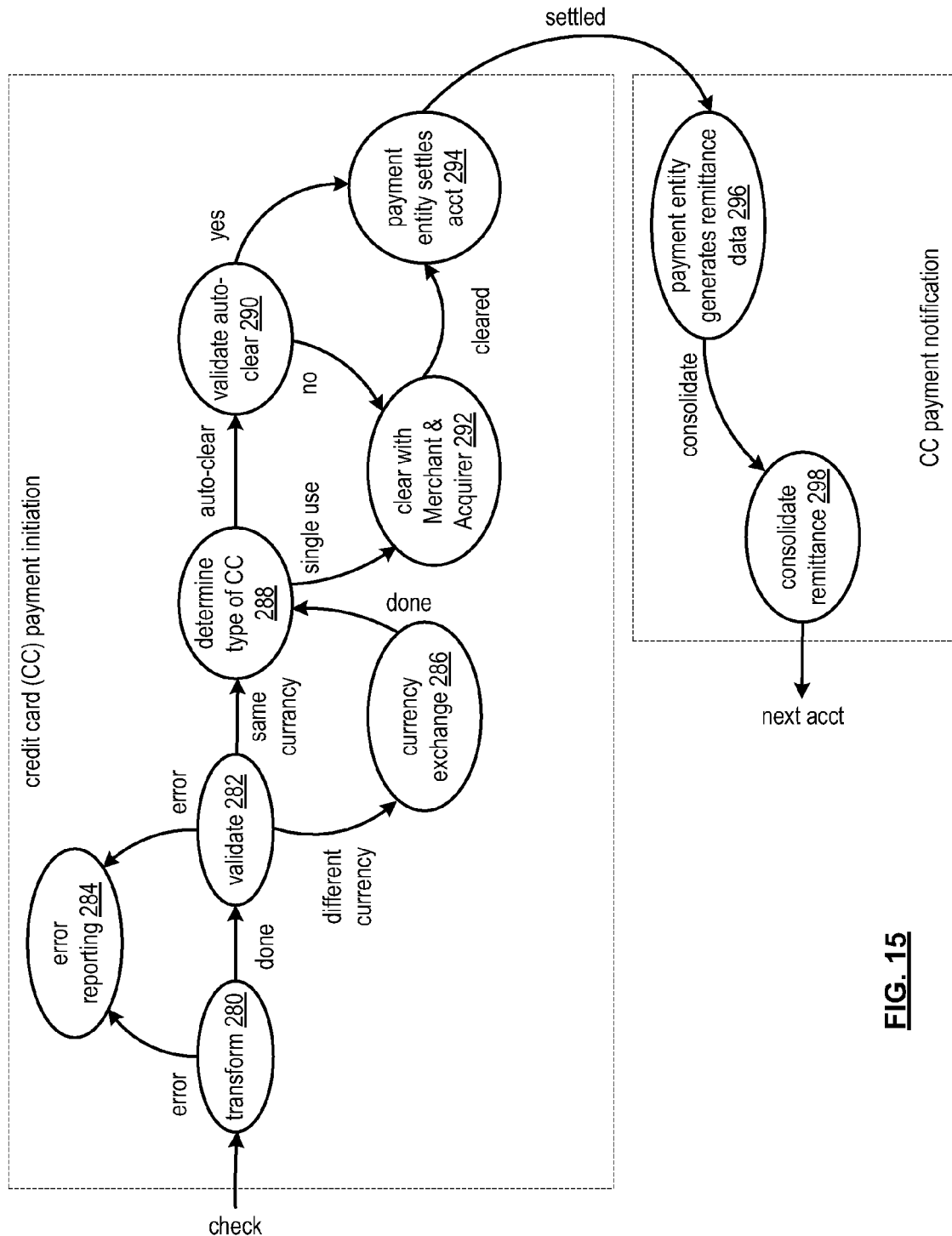
FIG. 15 is a state diagram of an embodiment of a method for processing credit card payment transactions in accordance with the present invention.

FIG. 15 is a state diagram of an embodiment of a method for processing credit card payment transactions that includes a payment initiation state and a payment notification state. In the payment initiation state, the payment entity device begins at a transformation state 280. The transformation involves generating a payment request in an appropriate format for a credit card payment. If a properly transformed payment request message cannot be generated, the payment entity device transitions to the error reporting state 284. In this state, the payment entity device identifies the current account payable as not being initiated due to a transformation error.

If, however, the transformation is successful, the payment entity device transitions to a validation state 282. In this state, the payment entity device is verifying that the payment request is in accordance with payment instructions of the client, of the payment entity, and/or of the client's financial institution making the payment. If the request is not validated, the payment entity device transitions to the error reporting state 284.

When the validation is successful, the payment entity device determines whether the currency of payment needs to be changed. When a currency exchange is needed, the payment entity device transitions to a current exchange state 266, where it exchanges the currency to the desired currency of payment. When the payment amount is converted into the desired currency, the payment entity device transitions to a decision state 288.

In state 288, the payment entity device determines whether the credit card is an auto-clear type card or a single use type card. When the credit card is an auto-clear type card, the payment entity device transitions to validate the auto-clear transaction state 290. In general, an auto clear process bypasses the clear operation (e.g., merchant transmits sales draft information, the acquiring back formats the information, routes a clearing message to the payment entity, and the payment entity routes the message to the issuing bank) of the conventional clear and settle operations of a credit card payment. If the auto clear is valid, the payment entity transitions to the settle account state 294.

In state 294, the payment entity settles the account by sending the funds to the financial institution of the creditor and/or by forwarding funds from the client's financial institution to the creditor's financial institution. Once the account payable is settled, the payment entity transitions to state 296.

If the auto clear is not valid or the type of credit card is a single use, the payment entity device transitions to the clear with merchant and acquirer state 292. In this state, the payment entity device follows the conventional clearing operation to clear the payment. When the payment has cleared, the payment entity device transitions to the settle account state 294. Once the account payable is settled, the payment entity transitions to state 296.

In state 296, the payment entity device generates remittance data. After the remittance data has been generated, the payment entity transitions to a consolidate remittance state 298. In this state, the payment entity device is accumulating the reconciled data for each account payable into a reconciliation data for the accounts payable of the accounts payable data file.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprising:

receiving, by a payment entity device configured to facilitate payment and reconciliation of accounts payable, a payables profile from a client entity processing module operated by a client that pays a plurality of creditors, wherein the payables profiles includes a plurality of accounts payable, one or more methods of payment associated with each of the plurality of accounts payable, and a financial institution associated with each of the one or more methods of payment;

receiving, by the payment entity device, an accounts payable data file from the client entity processing module, wherein the accounts payable data file includes the plurality of accounts payable and a total amount to be paid for each of the plurality of accounts payable;

determining, by the payment entity device, a method of payment for each of the plurality of accounts payable of the accounts payable data file in accordance with the payables profile;

initiating a first type of payment for a first one of the plurality of accounts payable in response to a first method of payment specified by the payables profile;

initiating a second type of payment for a second one of the plurality of accounts payable in response to a second method of payment specified by the payables profile; and initiating a third type of payment for a third one of the plurality of accounts payable in response to a third method of payment specified by the payables profile;

wherein initiating each respective type of payment comprises generating a payment request appropriate to the method of payment, verifying that the payment request is valid, and generating an error message if the validity is not verified; and reconciling payment of the accounts payable of the accounts payable data file, wherein, when the third type of payment is a payment card payment, the initiating the third type of payment comprises:

preliminary processing the third one of the plurality of accounts payable via at least one of: transformation, validation, and currency exchange to produce a preliminary processed account payable data;

determining whether the preliminary processed account payable data is to be processed by a first type of payment card transaction or a second type of payment card transaction;

wherein, when the preliminary processed account payable data is to be processed by the first type of payment card transaction, the initiating the third type of payment further comprises:

initiating a clearing process with at least one of: a merchant processing module and an acquirer processing module; and settling, by the payment entity device, the account payable when the preliminary processed account payable data has cleared the at least one of the merchant processing module and the acquirer processing module; and wherein, when the preliminary processed account payable data is to be processed by the second type of payment card transaction, the initiating the third type of payment further comprises:

settling, by the payment entity device, the account payable from the preliminary processed account payable data.

2. The method of claim 1 further comprises:

analyzing the accounts payable data file to determine whether accounts payable information is in a desired format; and when the accounts payable information is not in a desired format, translating format of the accounts payable information into the desired format.

3. The method of claim 1 further comprises:

receiving a first type of payment notification from a first financial institution processing module;

receiving a second type of payment notification from the first or a second financial institution processing module; and receiving a third type of payment notification from the first, the second, or a third financial institution processing module.

4. The method of claim 1, wherein, when the first type of payment is a check, the initiating the first type of payment comprises:

preliminary processing the first one of the plurality of accounts payable via at least one of: transformation, validation, and currency exchange to produce a preliminary processed account payable data;

determining whether the preliminary processed account payable data is to be processed by a first type of financial institution or a second type of financial institution;

when the preliminary processed account payable data is to be processed by the first type of financial institution, providing a data file of the preliminary processed account payable data to a first financial institution processing module corresponding to a financial institution of the first type of financial institution;

when the preliminary processed account payable data is to be processed by the second type of financial institution, determining whether check payment will be of a first type of check payment or a second type of check payment;

when the preliminary processed account payable data is to be processed by the second type of financial institution and the check payment is of the first type of check payment, executing, by the payment entity device, payment via the first type of check payment; and when the preliminary processed account payable data is to be processed by the second type of financial institution and the check payment is of the first type of check payment, providing the data file of the preliminary processed account payable data to a second financial institution processing module corresponding to a financial institution of the second type of financial institution.

5. The method of claim 1, wherein, when the second type of payment is a wire transfer or debit account transfer, the initiating the second type of payment comprises:

preliminary processing the second one of the plurality of accounts payable via at least one of: transformation, validation, and currency exchange to produce a preliminary processed account payable data;

determining whether the preliminary processed account payable data is to be processed by a first type of financial institution or a second type of financial institution;

when the preliminary processed account payable data is to be processed by the first type of financial institution, providing a data file of the preliminary processed account payable data to a first financial institution processing module corresponding to a financial institution of the first type of financial institution; and when the preliminary processed account payable data is to be processed by the second type of financial institution, providing the data file of the preliminary processed account payable data to a second financial institution processing module corresponding to a financial institution of the second type of financial institution.

6. The method of claim 1, wherein the payables profile further includes one or more account payable types associated with each of the plurality of accounts payable and a payment term associated with one or more of the plurality of accounts payable.

7. The method of claim 1, wherein the accounts payable data file further includes an invoice number, an item identifier, a quantity, a unit price, a subtotal amount, a tax amount, and a shipping and handling amount, associated with one or more of the plurality of accounts payable.

8. The method of claim 7, wherein the accounts payable data file further includes an alternative method of payment associated with at least one of the plurality of accounts payable, wherein the alternative method of payment is different than the one or more methods of payment associated with the at least one of the plurality of accounts payable included in the payables profile.

9. The method of claim 1, wherein the first type of payment is a promissory note, wherein the second type of payment is a rebate, and wherein the third type of payment is a business card payment.

10. The method of claim 1, wherein preliminary processing the third one of the plurality of accounts payable comprises determining whether the financial institution associated with the third method of payment is a member entity or a partner entity.

11. A method comprising:
  entering a loop for a plurality of accounts payable contained in an accounts payable data file, wherein the accounts payable data file includes a total amount to be paid for each of the plurality of accounts payable, and wherein the loop includes:
    determining, by a payment entity device configured to facilitate payment and reconciliation of accounts payable, a method of payment for an account payable of the plurality of accounts payable in accordance with a payables profile, wherein the payables profile includes the plurality of accounts payable, one or more methods of payment associated with each of the plurality of accounts payable, and a financial institution associated with each of the one or more methods of payment;
    initiating, by the payment entity device, a payment of the account payable in accordance with the method of payment specified by the payables profile, wherein initiating the payment comprises generating a payment request appropriate to the method of payment, verifying that the payment request is valid, and generating an error message if the validity is not verified;
    processing, by the payment entity device, payment notification in accordance with the method of payment;
  exiting the loop when the plurality of accounts payable has been processed in accordance with the loop; and
  reconciling payment of the accounts payable of the accounts payable data file,
  wherein, when the method of payment is a payment card payment, the initiating the payment comprises:
    preliminary processing the account payable via at least one of: transformation, validation, and currency exchange to produce a preliminary processed account payable data;
    determining whether the preliminary processed account payable data is to be processed by a first type of payment card transaction or a second type of payment card transaction;
    wherein, when the preliminary processed account payable data is to be processed by the first type of payment card transaction, the initiating the payment further comprises:
      initiating a clearing process with at least one of: a merchant processing module and an acquirer processing module; and
      settling, by the payment entity device, the account payable when the preliminary processed account payable data has cleared the at least one of the merchant processing module and the acquirer processing module; and
    wherein, when the preliminary processed account payable data is to be processed by the second type of payment card transaction, the initiating the payment further comprises:
      settling, by the payment entity device, the account payable from the preliminary processed account payable data.

12. The method of claim 11, wherein the methods of payment included in the payables profile comprises at least two of:
  a commercial paper;
  a funds transfer;
  monetary consideration such as a rebate, refund, or exchange;
  a debit account transfer; and
  a credit card payment.

13. The method of claim 11, wherein, when the method of payment is a check, the initiating the payment comprises:
  preliminary processing the account payable via at least one of: transformation, validation, and currency exchange to produce a preliminary processed account payable data;
  determining whether the preliminary processed account payable data is to be processed by a first type of financial institution or a second type of financial institution;
  when the preliminary processed account payable data is to be processed by the first type of financial institution, providing the preliminary processed account payable data to a first financial institution processing module corresponding to a financial institution of the first type of financial institution;
  when the preliminary processed account payable data is to be processed by the second type of financial institution, determining whether a check payment will be of a first type of check payment or a second type of check payment;
  when the preliminary processed account payable data is to be processed by the second type of financial institution and the check payment is of the first type of check payment, executing, by the payment entity device, payment via the first type of check payment; and
  when the preliminary processed account payable data is to be processed by the second type of financial institution and the check payment is of the first type of check payment, providing the preliminary processed account payable data to a second financial institution processing module corresponding to a financial institution of the second type of financial institution.

14. The method of claim 11, wherein, when the method of payment is a wire transfer or debit account transfer, the initiating the payment comprises:
    preliminary processing the account payable via at least one of: transformation, validation, and currency exchange to produce a preliminary processed account payable data;
    determining whether the preliminary processed account payable data is to be processed by a first type of financial institution or a second type of financial institution;
    when the preliminary processed account payable data is to be processed by the first type of financial institution, providing the preliminary processed account payable data to a first financial institution processing module corresponding to a financial institution of the first type of financial institution; and
    when the preliminary processed account payable data is to be processed by the second type of financial institution, providing the preliminary processed account payable data to a second financial institution processing module corresponding to a financial institution of the second type of financial institution.

15. An apparatus comprising:
    a processing module; and
    memory coupled to the processing module, wherein the processing module, at least partially based on operational instructions stored in the memory, functions to:
    receive a payables profile from a client entity processing module operated by a client that pays a plurality of creditors, wherein the payables profile includes a plurality of accounts payable, one or more methods of payment associated with each of the plurality of accounts payable, and a financial institution associated with each of the one or more methods of payment;
    receive an accounts payable data file from the client entity processing module, wherein the accounts payable data file includes the plurality of accounts payable and a total amount to be paid for each of the plurality of accounts payable;
    determine a method of payment for each of the plurality of accounts payable of the accounts payable data file in accordance with the payables profile;
    initiate a first type of payment for a first one of the plurality of accounts payable in response to a first method of payment specified by the payables profile;
    initiate a second type of payment for a second one of the plurality of accounts payable in response to a second method of payment specified by the payables profile; and
    initiate a third type of payment for a third one of the plurality of accounts payable in response to a third method of payment specified by the payables profile;
    wherein initiating each respective type of payment comprises generating a payment request appropriate to the method of payment, verifying that the payment request is valid, and generating an error message if the validity is not verified; and
    reconcile payment of the accounts payable of the accounts payable data file,
    wherein, when the third type of method payment is a payment card payment, the processing module initiates the third type of payment by:
        preliminary processing the third one of the plurality of accounts payable via at least one of: transformation, validation, and currency exchange to produce a preliminary processed account payable data;
        determining whether the preliminary processed account payable data is to be processed by a first type of payment card transaction or a second type of payment card transaction;
        wherein, when the preliminary processed account payable data is to be processed by the first type of payment card transaction, the initiating the third type of payment further comprises:
            initiating a clearing process with at least one of: a merchant processing module and an acquirer processing module; and
            settling the account payable when the preliminary processed account payable data has cleared the at least one of the merchant processing module and the acquirer processing module; and
        wherein, when the preliminary processed account payable data is to be processed by the second type of payment card transaction, the initiating the third type of payment further comprises:
            settling the account payable from the preliminary processed account payable data.

16. The apparatus of claim 15, wherein the processing module further functions to:
    analyze the accounts payable data file to determine whether accounts payable information is in a desired format; and
    when the accounts payable information is not in a desired format, translate format of the accounts payable information into the desired format.

17. The apparatus of claim 15, wherein the processing module further functions to:
    receive a first type of payment notification from a first financial institution processing module;
    receive a second type of payment notification from the first or a second financial institution processing module; and
    receive a third type of payment notification from the first, the second, or a third financial institution processing module.

18. The apparatus of claim 15, wherein, when the first type of payment is a check, the processing module initiates the first type of payment by:
    preliminary processing the first one of the plurality of accounts payable via at least one of: transformation, validation, and currency exchange to produce a preliminary processed account payable data;
    determining whether the preliminary processed account payable data is to be processed by a first type of financial institution or a second type of financial institution;
    when the preliminary processed account payable data is to be processed by the first type of financial institution, providing a data file of the preliminary processed account payable data to a first financial institution processing module corresponding to a financial institution of the first type of financial institution;
    when the preliminary processed account payable data is to be processed by the second type of financial institution, determining whether check payment will be of a first type of check payment or a second type of check payment;
    when the preliminary processed account payable data is to be processed by the second type of financial institution and the check payment is of the first type of check payment, executing payment via the first type of check payment; and
    when the preliminary processed account payable data is to be processed by the second type of financial institution and the check payment is of the first type of check payment, providing the data file of the preliminary processed account payable data to a second financial institution processing module corresponding to a financial institution of the second type of financial institution.

19. The apparatus of claim 15, wherein, when the second type of payment is a wire transfer or debit account transfer, the processing module initiates the second type of payment by:
   preliminary processing the second one of the plurality of accounts payable via at least one of: transformation, validation, and currency exchange to produce a preliminary processed account payable data;
   determining whether the preliminary processed account payable data is to be processed by a first type of financial institution or a second type of financial institution;
   when the preliminary processed account payable data is to be processed by the first type of financial institution, providing a data file of the preliminary processed account payable data to a first financial institution processing module corresponding to a financial institution of the first type of financial institution; and
   when the preliminary processed account payable data is to be processed by the second type of financial institution, providing the data file of the preliminary processed account payable data to a second financial institution processing module corresponding to a financial institution of the second type of financial institution.

20. An apparatus comprising:
   a processing module; and
   memory coupled to the processing module, wherein the processing module, at least partially based on operational instructions stored in the memory, functions to:
   enter a loop for a plurality of accounts payable contained in an accounts payable data file, wherein the accounts payable data file includes a total amount to be paid for each of the plurality of accounts payable, and wherein the loop includes:
   determining a method of payment for an account payable of the plurality of accounts payable in accordance with a payables profile, wherein the payables profile includes the plurality of accounts payable, one or more methods of payment associated with each of the plurality of accounts payable, and a financial institution associated with each of the one or more methods of payment;
   initiating a payment of the account payable in accordance with the method of payment specified by the payables profile, wherein initiating the payment comprises generating a payment request appropriate to the method of payment, verifying that the payment request is valid, and generating an error message if the validity is not verified;
   processing payment notification in accordance with the method of payment;
   exit the loop when the plurality of accounts payable has been processed in accordance with the loop; and
   reconciling payment of the accounts payable of the accounts payable data file,
   wherein, when the method of payment is a payment card payment, the processing module initiates the payment by:
      preliminary processing the account payable via at least one of: transformation, validation, and currency exchange to produce a preliminary processed account payable data;
      determining whether the preliminary processed account payable data is to be processed by a first type of payment card transaction or a second type of payment card transaction;
      wherein, when the preliminary processed account payable data is to be processed by the first type of payment card transaction, the initiating the payment further comprises:
         initiating a clearing process with at least one of: a merchant processing module and an acquirer processing module; and
         settling the account payable when the preliminary processed account payable data has cleared the at least one of the merchant processing module and the acquirer processing module; and
      wherein, when the preliminary processed account payable data is to be processed by second type of payment card transaction, the initiating the payment further comprises:
         settling the account payable from the preliminary processed account payable data.

21. The apparatus of claim 20, wherein the methods of payment included in the payable profile comprises at least two of:
   a commercial paper;
   a funds transfer;
   monetary consideration such as a rebate, refund, or exchange;
   a debit account transfer; and
   a credit card payment.

22. The apparatus of claim 20, wherein, when the method of payment is a check, the processing module initiates the payment by:
   preliminary processing the account payable via at least one of: transformation, validation, and currency exchange to produce a preliminary processed account payable data;
   determining whether the preliminary processed account payable data is to be processed by a first type of financial institution or a second type of financial institution;
   when the preliminary processed account payable data is to be processed by the first type of financial institution, providing the preliminary processed account payable data to a first financial institution processing module corresponding to a financial institution of the first type of financial institution;
   when the preliminary processed account payable data is to be processed by the second type of financial institution, determining whether a check payment will be of a first type of check payment or a second type of check payment;
   when the preliminary processed account payable data is to be processed by the second type of financial institution and the check payment is of the first type of check payment, executing payment via the first type of check payment; and
   when the preliminary processed account payable data is to be processed by the second type of financial institution and the check payment is of the first type of check payment, providing the preliminary processed account payable data to a second financial institution processing module corresponding to a financial institution of the second type of financial institution.

23. The apparatus of claim 20, wherein, when the method of payment is a wire transfer or debit account transfer, the processing module initiates the payment by:
   preliminary processing the account payable via at least one of: transformation, validation, and currency exchange to produce a preliminary processed account payable data;
   determining whether the preliminary processed account payable data is to be processed by a first type of financial institution or a second type of financial institution;

when the preliminary processed account payable data is to be processed by the first type of financial institution, providing the preliminary processed account payable data to a first financial institution processing module corresponding to a financial institution of the first type of financial institution; and when the preliminary processed account payable data is to be processed by the second type of financial institution, providing the preliminary processed account payable data to a second financial institution processing module corresponding to a financial institution of the second type of financial institution.

* * * * *